(12) United States Patent
Lewis et al.

(10) Patent No.: US 8,639,908 B2
(45) Date of Patent: Jan. 28, 2014

(54) DYNAMICALLY MANAGING AVAILABLE DATA STORAGE WITHIN AN AUTOMATED DATA STORAGE SYSTEM

(75) Inventors: Cecilia C. Lewis, San Jose, CA (US);
Gerard M. Dearing, San Jose, CA (US);
Michael J. Koester, Hollister, CA (US);
Thomas E. Litty, Mahopac, NY (US);
Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 13/184,420

(22) Filed: Jul. 15, 2011

(65) Prior Publication Data
US 2013/0019071 A1 Jan. 17, 2013

(51) Int. Cl.
*G06F 12/02* (2006.01)
(52) U.S. Cl.
USPC .................................. 711/173; 711/E12.019
(58) Field of Classification Search
USPC .................. 711/170, 173, E12.019, E12.006
See application file for complete search history.

(56) References Cited

U.S. PATENT DOCUMENTS

| | | | |
|---|---|---|---|
| 6,954,768 B2 | 10/2005 | Carlson et al. | |
| 8,166,257 B1 * | 4/2012 | Holl et al. | 711/154 |
| 2006/0036825 A1 * | 2/2006 | Maki et al. | 711/165 |
| 2006/0075204 A1 | 4/2006 | Kumar | |
| 2006/0253658 A1 | 11/2006 | Mathieu et al. | |
| 2009/0292895 A1 * | 11/2009 | Matsubara et al. | 711/170 |
| 2009/0300315 A1 | 12/2009 | Agombar et al. | |
| 2012/0254861 A1 * | 10/2012 | Down et al. | 718/1 |

OTHER PUBLICATIONS

"Innovation TechSupport," Innovation Data Processing, Jun. 2002, vol. 5.1, pp. 1-6.

* cited by examiner

*Primary Examiner* — Hal Schnee
(74) *Attorney, Agent, or Firm* — Zilka-Kotab, PC

(57) ABSTRACT

In one embodiment, a computer program product includes a computer readable storage medium having computer readable program code embodied therewith, the computer readable program code being configured to: assign volume(s) to either a storage group or a reserve storage pool group, designate each of the volume(s) assigned to the storage group as a storage volume, designate each of the volume(s) assigned to the reserve storage pool group as a reserve storage volume, receive policy attributes for the storage group including a storage utilization goal and a default reserve storage pool assignment, monitor a storage utilization level for the storage group, detect when the storage utilization level for the storage group falls outside of the ideal storage utilization range, and adjust an available storage amount for the storage group to bring the storage utilization level within the ideal storage utilization range.

20 Claims, 3 Drawing Sheets

DYNAMICALLY MANAGING AVAILABLE DATA STORAGE WITHIN AN AUTOMATED DATA STORAGE SYSTEM

BACKGROUND

The present invention relates to automated data storage systems and more particularly, this invention relates to dynamically managing available storage within an automated data storage system.

Currently, data storage systems include a disk cache subsystem having different physical disk drive media (DDM). The differences in the DDM includes different physical drive types, capacities, manufacturers, rotational speeds, etc.

Due to the nature of such storage systems, if any number of DDMs are defective (e.g., suffering from faulty microcode, manufacturing problems, mechanical breakdown, etc.), the problem is not easily identifiable and/or avoidable once the DDM is installed in an automated data storage system in the field.

In order to mitigate or prevent lost data or productivity as a result of such failures, some users maintain storage devices in reserve, and initialize these devices into the system on an as-needed basis. However, precisely and accurately identifying a failing device and appropriate replacement continue to frustrate attempted improvements to data storage systems. In addition, in most systems, there is an anticipation that data storage demand will grow over time, and therefore it is appropriate to maintain reserved storage to manage that growth.

This is particularly troublesome where multiple users may be remotely sharing storage space and/or reserve storage devices across sysplexes. This is primarily because a given user in the shared storage system may not successfully recognize reserve storage devices which are in use by another user's system.

Thus, a major theme in improving data management strategy is simplification. One of the difficulties in realizing such improvements is storage management. While storage management via data facility storage management subsystem(s) (DFSMS) is still very advanced compared to most platforms, the number of steps required to add storage dynamically to a system is a concern. In particular, the multiplicity of required user interfaces and steps makes the process error-prone.

As mentioned above, it is typically the mainframe storage administrator's responsibility to manage a system that provides efficient use of resources. This involves maintaining storage groups such that they are tuned to application usage, as well as allowing for application/storage growth based on needs of the business. Some storage administrators plan to ensure storage is defined and made available to the different storage groups to accommodate future growth. Others maintain a set of "extra pre-defined volumes" and, on an as-needed basis, assign one or more to a particular storage group. When a new volume must be added, some customers estimate that it may take as long as hours or days between the time a request is made for more storage, to when it is fulfilled. In all cases, careful planning and numerous manual steps across various user interfaces are required, and each carries risk of error resulting in lost data.

In current data management schemes, the storage administrator must perform multiple steps using various interfaces in order to accomplish this task, according to the resident operating system (OS).

For example, when managing data on a system utilizing IBM® z/OS, these steps may include: identifying that a storage group needs additional capacity; identifying available volume(s) to add to the storage group; using an operator console, varying the volume(s) offline from all systems; submitting an "ICKDSF INIT" job to initialize the volume(s) (e.g. "volser," "vtoc," "sms," etc.) for the target storage group; via a system display and search facility (SDSF), verifying that the job ran successfully; via interactive storage management facility (ISMF), updating a source control data set (SCDS) by adding "volser(s)" to the volume list of the target pool storage group; via ISMF, activating the SCDS; and varying the volume(s) online to all systems where needed.

Thus, increasing storage available to a given storage group currently includes performing a set of complex tasks to provide addressable system-managed disk storage for system and application use.

SUMMARY OF THE INVENTION

In one embodiment, a computer program product for managing storage includes a computer readable storage medium having computer readable program code embodied therewith, the computer readable program code including computer readable program code configured to assign each of one or more volumes to either one or more storage groups or one or more reserve storage pool groups, computer readable program code configured to designate each of the one or more volumes assigned to the one or more storage groups as a storage volume, computer readable program code configured to designate each of the one or more volumes assigned to the one or more reserve storage pool groups as a reserve storage volume, and computer readable program code configured to receive policy attributes for at least one of the storage groups, the policy attributes including a storage utilization goal for delimiting an ideal storage utilization range for the at least one storage group, and a default reserve storage pool assignment for associating a default reserve storage pool group with the at least one storage group, computer readable program code configured to monitor a storage utilization level for the at least one storage group, computer readable program code configured to detect when the storage utilization level for the at least one storage group falls outside of the ideal storage utilization range, and computer readable program code configured to adjust an available storage amount for the at least one storage group to bring the storage utilization level within the ideal storage utilization range.

In another embodiment, a system includes at least one data storage device for storing one or more storage volumes, logic configured to define at least two pool groups, the at least two pool groups including at least one storage group, and at least one reserve storage pool group, logic configured to assign each of the one or more storage volumes to either one or more of the at least one storage group or one or more of the at least one reserve storage pool group, logic configured to designate each of the one or more volumes assigned to a storage group as a storage volume, logic configured to designate each of the one or more volumes assigned to a reserve storage pool group as a reserve storage volume, logic configured to receive policy attributes for at least one storage group, the policy attributes including a storage utilization goal for delimiting an ideal storage utilization range for the at least one storage group, and a default reserve storage pool assignment for associating a default reserve storage pool group with the at least one storage group, logic configured to monitor a storage utilization level for the at least one storage group, logic configured to detect when the storage utilization level for the at least one storage group falls outside of the ideal storage utilization range, and logic configured to adjust an available storage amount for the at least one storage group to bring the storage utilization level within the ideal storage utilization range.

In still another embodiment, a method includes assigning each of one or more volumes to either one or more storage groups or one or more reserve storage pool groups, designating each of the one or more volumes assigned to the one or more storage groups as a storage volume, designating each of the one or more volumes assigned to the one or more reserve storage pool groups as a reserve storage volume, receiving policy attributes for at least one of the storage groups, the policy attributes including a storage utilization goal for delimiting an ideal storage utilization range for the at least one storage group, and a default reserve storage pool assignment for associating a default reserve storage pool group with the at least one storage group, monitoring a storage utilization level for the at least one storage group, detecting when the storage utilization level for the at least one storage group falls outside of the ideal storage utilization range, and adjusting an available storage amount for the at least one storage group to bring the storage utilization level within the ideal storage utilization range.

Other aspects and embodiments of the present invention will become apparent from the following detailed description, which, when taken in conjunction with the drawings, illustrate by way of example the principles of the invention.

DETAILED DESCRIPTION

Figure 1:
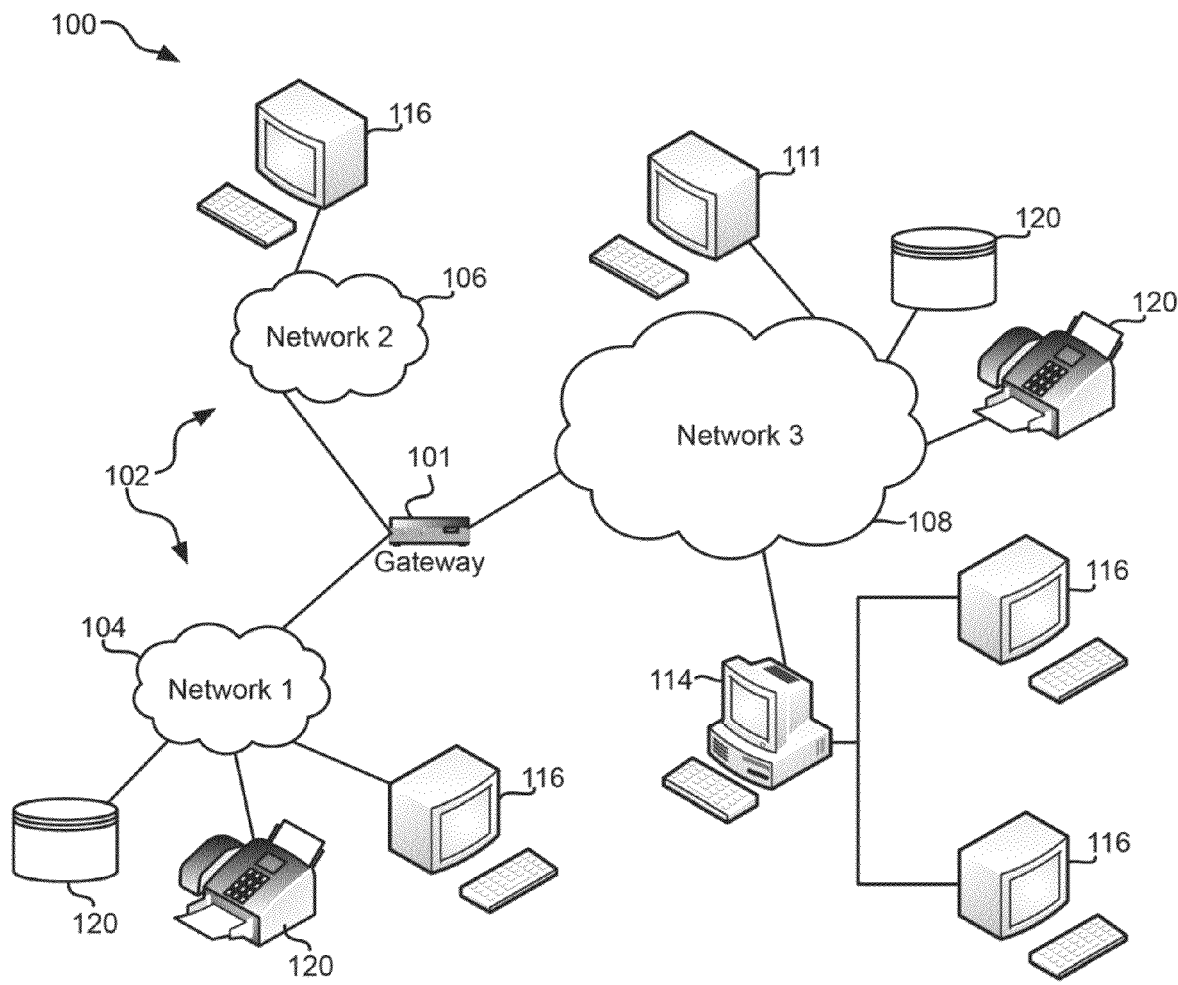
FIG. 1 illustrates a network architecture, in accordance with one embodiment.

The following description is made for the purpose of illustrating the general principles of the present invention and is not meant to limit the inventive concepts claimed herein. Further, particular features described herein may be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamically managing available storage within an automated data storage system. In one approach, some storage volumes of a data storage system are assigned to a reserve storage pool, thereby creating reserved storage volumes. These reserved storage volumes may be isolated from the other storage volumes to avoid unintentional use thereof.

In addition, the data storage system is able to discover the reserved storage volumes so that it can access and use them when appropriate.

In one general embodiment, a disk-based data storage system includes a computer program product for managing storage including a computer readable storage medium having computer readable program code embodied therewith, the computer readable program code including computer readable program code configured to assign each of one or more volumes to either one or more storage groups or one or more reserve storage pool groups, computer readable program code configured to designate each of the one or more volumes assigned to the one or more storage groups as a storage volume, computer readable program code configured to designate each of the one or more volumes assigned to the one or more reserve storage pool groups as a reserve storage volume, and computer readable program code configured to receive policy attributes for at least one of the storage groups, the policy attributes including a storage utilization goal for delimiting an ideal storage utilization range for the at least one storage group, and a default reserve storage pool assignment for associating a default reserve storage pool group with the at least one storage group, computer readable program code configured to monitor a storage utilization level for the at least one storage group, computer readable program code configured to detect when the storage utilization level for the at least one storage group falls outside of the ideal storage utilization range, and computer readable program code configured to adjust an available storage amount for the at least one storage group to bring the storage utilization level within the ideal storage utilization range.

In another general embodiment, a disk-based data storage system includes a system including at least one data storage device for storing one or more storage volumes, logic configured to define at least two pool groups, the at least two pool groups including at least one storage group, and at least one reserve storage pool group, logic configured to assign each of the one or more storage volumes to either one or more of the at least one storage group or one or more of the at least one reserve storage pool group, logic configured to designate each of the one or more volumes assigned to a storage group as a storage volume, logic configured to designate each of the one or more volumes assigned to a reserve storage pool group as a reserve storage volume, logic configured to receive policy attributes for at least one storage group, the policy attributes including a storage utilization goal for delimiting an ideal storage utilization range for the at least one storage group, and a default reserve storage pool assignment for associating a default reserve storage pool group with the at least one storage group, logic configured to monitor a storage utilization level for the at least one storage group, logic configured to detect when the storage utilization level for the at least one storage group falls outside of the ideal storage utilization range, and logic configured to adjust an available storage amount for the at least one storage group to bring the storage utilization level within the ideal storage utilization range.

In still another general embodiment, a disk-based data storage system includes a method including assigning each of one or more volumes to either one or more storage groups or one or more reserve storage pool groups, designating each of the one or more volumes assigned to the one or more storage groups as a storage volume, designating each of the one or more volumes assigned to the one or more reserve storage pool groups as a reserve storage volume, receiving policy attributes for at least one of the storage groups, the policy attributes including a storage utilization goal for delimiting an ideal storage utilization range for the at least one storage group, and a default reserve storage pool assignment for associating a default reserve storage pool group with the at least one storage group, monitoring a storage utilization level for the at least one storage group, detecting when the storage utilization level for the at least one storage group falls outside of the ideal storage utilization range, and adjusting an available storage amount for the at least one storage group to bring the storage utilization level within the ideal storage utilization range.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other operating systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

Furthermore, while the methods and systems described herein may be described with primary reference to the IBM® z/OS environment, the methods and systems described herein may be applied and utilized in conjunction with any operating system which utilizes 80-character labels for data storage volumes, as understood by one having ordinary skill in the art. In addition, modifications may be made to the 80-character labels for use in systems which do not utilize 80-character labels, as would be understood by one of skill in the art upon reading the present descriptions.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
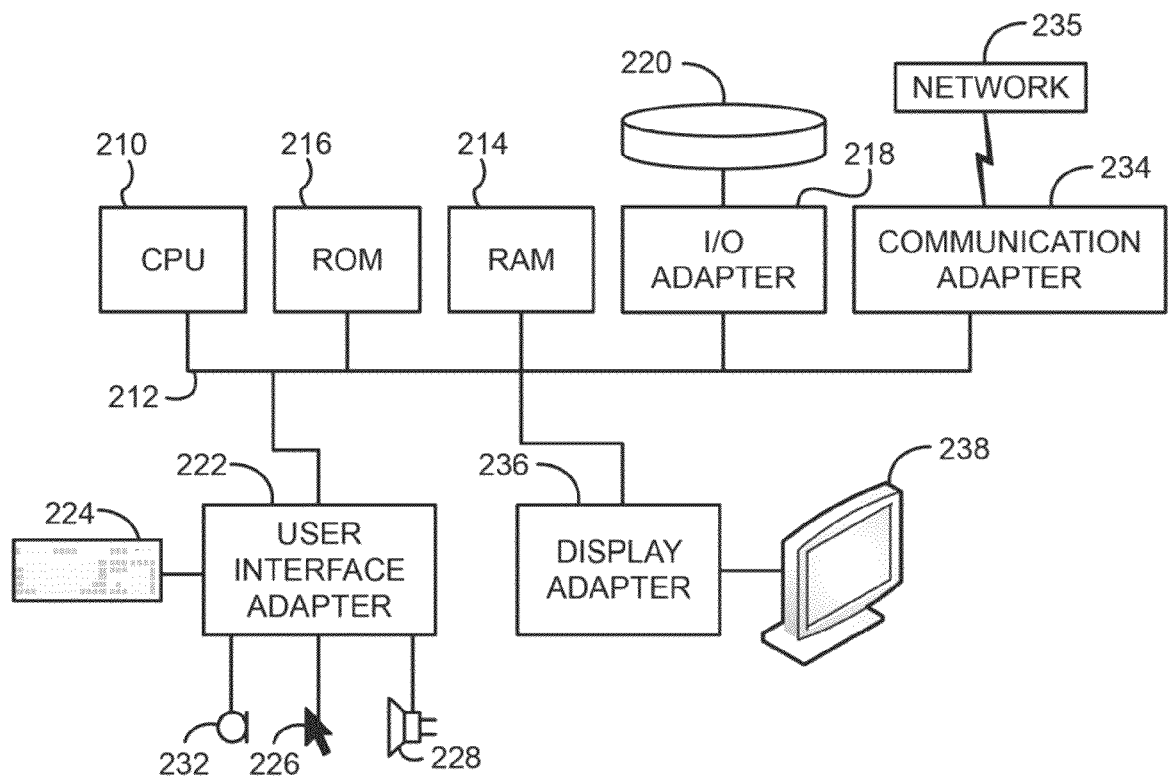
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The system, method, and computer program product described herein simplify and modernize the storage administrator user experience by providing storage management functionality through a role and task-oriented, possibly browser-based user interface. It is intended to provide advantages to new or less skilled storage administrators, as well as for the experienced storage administrator. This may be accomplished by developing a storage management application (SMA), which may be made available via z/OS Management Facility (z/OSMF) or any other operating systems, applications, or frameworks. This storage management application may be designed to be expandable to allow for various storage management tasks.

According to one embodiment, storage management may be primarily related to data facility storage management subsystem (DFSMS), and the browser-based user interface may take the form of a z/OSMF.

In another approach, storage management may provide the user with the ability to perform the task of adding storage to a storage management subsystem (SMS) pool storage group through a single user interface (UI) via an "Add Storage Wizard."

One aspect of this function confers the ability to simplify the management of a user's "extra, pre-defined volumes." To assist in this management, this approach introduces and employs the reserve storage pool (RSP) resource.

In some embodiments, a reserve storage pool refers to a group of volumes available for future use, whether they may eventually be used for SMS storage groups or for other reasons. The reserve storage pool resource is meant to replace the need for a storage administrator to manually maintain a list of defined but unused volumes.

In more embodiments, a storage administrator may further define reserve storage pools to fit storage needs, such as high performing storage, large devices, DB2 pools, etc. A volume may be marked as belonging to a reserve storage pool by placing special characters (e.g., the reserve storage pool name) in the OWNERID field of the volume label. Any number of volumes may have the same reserve storage pool name. In addition, the reserve storage pool takes advantage of new functionality in z/OS where a volume may be initialized to a reserved state by modifying a field in the volume label. Being in the reserved state prevents any volume in the reserve storage pool from coming online to any system, thus avoiding the potential that another system inside or outside the sysplex may start using it. Volumes that are initialized in the reserved state and marked as part of a reserve storage pool may be easily discovered by the system. These volumes remain in the reserve storage pool until an overt action is taken to re-initial them to a non-reserved volume.

Therefore, reserved storage pools allow storage administrators the ability to more effectively maintain and isolate groups of volumes for future use. In many environments, including z/OS, z/VM, z/VSE, etc., volumes are identified by a volume label record, typically a string of ASCII characters. The volume label record may further be divided into substrings with separate functionalities, for example a volume label record may contain information regarding the operational status of the volume, the availability of the volume for use, any associations with other volumes, etc. Of particular interest in the present context are volume availability, whether the volume is associated with a pool of reserve storage volumes, and if so, which.

In another approach, an installation may further have any number of reserve storage pools, where each reserve storage pool has a name. To belong to a specific reserve storage pool, the volume may be initialized as a reserve storage pool volume. This may be accomplished by initializing the volume with the new RESERVED parameter and specifying a specific reserve storage pool name with the OWNERID parameter in the form "IBMRSPxxxxxxxx." Here, the "xxxxxxxx" designation refers to a 1-8 character RSP label. For example, within the IBM z/OS, initialization may occur by using the "ICKDSF INIT" command. Note that in the z/OS example, the VOLID parameter is required when specifying the RESERVED parameter.

Designating a volume as "RESERVED" additionally means that the volume may not be brought online. Thus, reserve storage pool volumes may remain offline until they are made available for use by being re-initialized as non-reserve storage pool volumes. As will be understood by one having ordinary skill in the art, this may occur implicitly through an Add Storage wizard or explicitly by the storage administrator.

For example, when using ICKDSF to initialize a volume, a new parameter called RESERVE may be added to the INIT command. When the RESERVE parameter is specified, the volume may be initialized placing 'RSV1' in the 'VOL1' record field of the 80-character volume label record. The existing OWNERID parameter is added to supply the reserve storage pool name. In this example, the OWNERID parameter may be represented as 'DB2GROUP.'

Table 1 depicts an exemplary resulting volume label record at cylinder 0 head 0 record 3 within an IBM z/OS architecture.

TABLE 1

Exemplary Volume Label Record Using RESERVE and OWNERID parameters

| + | D0  | 00000000 | 03040050 | E5D6D3F1 | D9E2D7F1 | *.......&VOL1RSV1* |
|---|-----|----------|----------|----------|----------|--------------------|
| + | E0  | D4F2F5F0 | F2F74000 | 00000101 | 40404040 | *RP5027..........* |
| + | F0  | 40404040 | 40404040 | 40404040 | 40404040 | *................* |
| + | 100 | 40C9C2D4 | D9E2D7D9 | F2404040 | D6D3F140 | *.DB2GROUP.......* |
| + | 110 | 40404040 | 40404040 | 40404040 | 40404040 | *................* |
| + | 120 | 40404040 | 40404040 | 40404040 |          | *................* |

Although these reserve volumes may not be brought online, they may still be viewed by interactive storage management framework (ISMF) or system commands that may display offline volumes. In order to prevent accidental data loss, any attempt to bring a RSP volume online may not permit the RSP volume to come online, but will instead result in an error.

Furthermore, in some approaches the system, for example by SMA, may discover reserve storage pools existing within the IO configuration for the current system without any additional user input after system configuration.

Because it is difficult for a system in one sysplex to determine whether the volume is online to a different sysplex, requiring that a RSP volume remain offline avoids the situation where an "available" volume is already online and in-use by a system in a second sysplex, but subsequently re-initialized for system use in the first sysplex (via SMA, the storage administrator, or otherwise as understood by one having ordinary skill in the art). Therefore, requiring that RSP volumes remain offline avoids losses in data and productivity caused by re-initializing a volume already in use.

This functionality allows a volume to be marked as reserved by initializing the first four bytes of the volume label record with characters indicating that the volume is reserved as opposed to available, for example, in z/OS by using 'RSV1' instead of 'VOL1' before the volume serial number. By placing 'RSV1' instead of 'VOL1' before the volume serial number, this may ensure that the volume may not come online. For a volume to be able to come online it must have a valid volume label record that begins with 'VOL1' followed by the volume serial number,' according to some operating systems, such as z/OS. Special characters may be placed in the OWNERID field of the volume label to denote the name of a reserve storage pool. Together, the 'RSV1' characters and specification of an OWNERID field denote the volume as a reserve storage pool volume. These volumes may subsequently be "self-discovered" in this example by using the UCBSCAN service to scan the offline volumes looking for a volume label with the 'RSV1' characters and a non-blank OWNERID field. Of course, this is merely an illustrative example showcasing features of z/OS, and may similarly be accomplished using analogous functions resident within other operating systems as understood by one having ordinary skill in the art.

To support RSP functionality, this approach to automated data storage management may further introduce policy for use in automated storage administration, for example by the SMA. This policy facilitates the automated nature of data storage management according to the present description by enabling a system administrator to set appropriate conditions for manipulating data storage management by adding storage to an existing pool, removing storage from active use to reserve status, changing storage from reserve status to active status, changing a reserve storage pool associated with a given storage group, etc., as would be understood by one having ordinary skill in the art upon reading the present descriptions.

In one approach, policy may include a storage utilization goal (SUG), which delimits the ideal storage utilization for a given storage group. Furthermore, the SUG may operate as a threshold, and when storage utilization exceeds the threshold value, the storage administrator, SMA, etc., may be instructed to increase available storage according to the user-defined SUG policy. The SUG may be expressed as a percentage of total storage in use, number of volumes in use, etc., as would be understood by one having ordinary skill in the art upon reading the present descriptions. In more approaches, the SUG may indicate, at least partially, how much reserve storage to render active storage.

Additionally, the policy may further include a default reserve storage pool (DRSP) parameter, which identifies and assigns a default RSP for a given storage group.

In one approach, where policy attributes define a DRSP, automated storage administration may automatically take storage resources from the RSP upon a determination that additional storage resources are necessary. Additionally, this feature optimizes storage utilization by avoiding wastefully redundant or overabundant assignment of RSPs to a given storage group, instead allowing a more efficient and dynamic distribution of overall system storage resources as needed in real-time and without user intervention.

Where no DRSP is designated, the system may alternatively seek, initialize, and mount available (i.e. offline) RSP volumes according to the RESERVE policy parameter, thereby obviating the need for user input in order to accommodate varying system needs.

Figure 3:
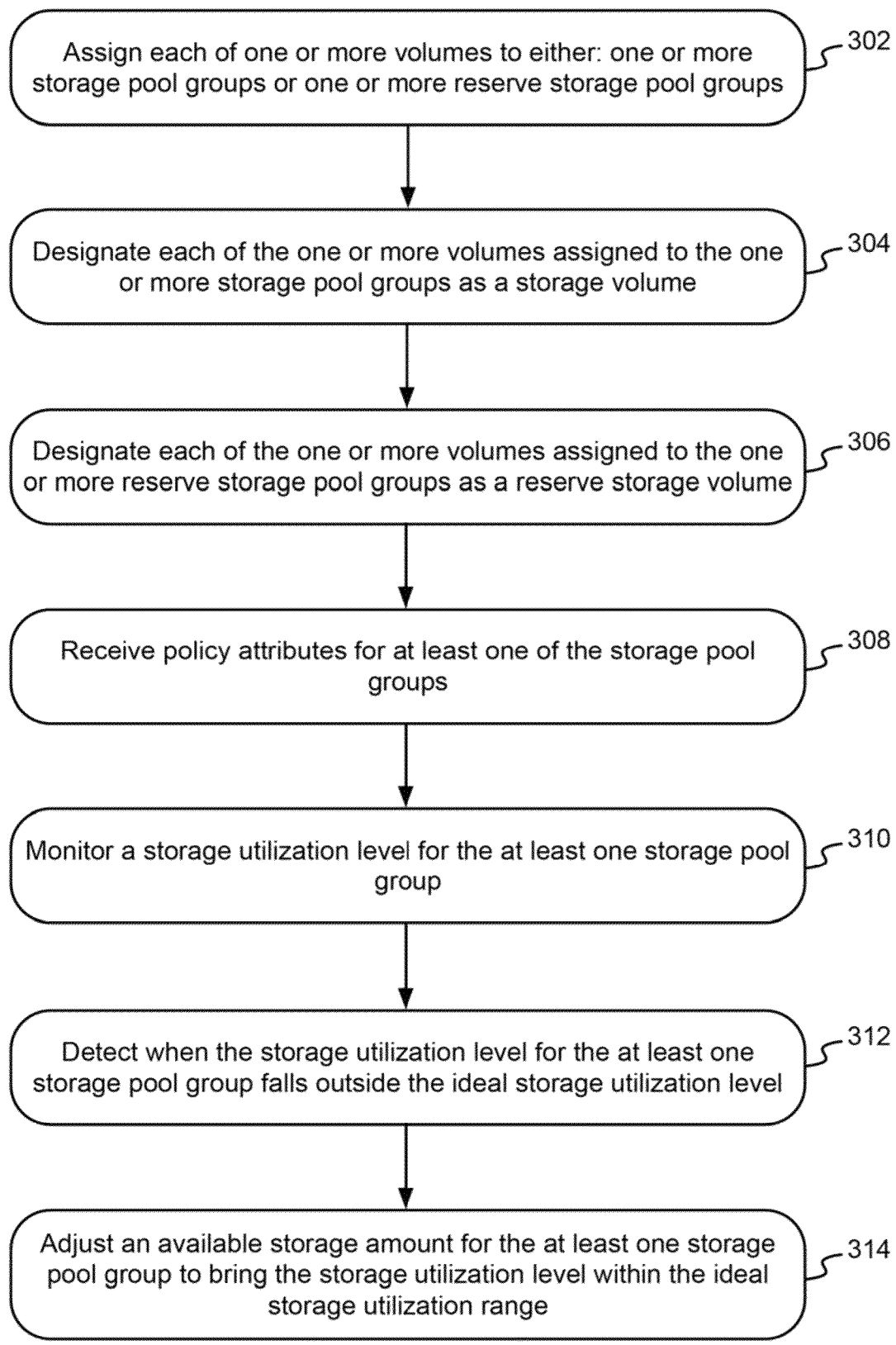
FIG. 3 illustrates a flowchart of a method, in accordance with one embodiment.

Now referring to FIG. 3, a method 300 for managing storage is shown according to one embodiment. The method 300 may be carried out in any desired environment, including those shown in FIGS. 1-2, according to various embodiments. More or less operations may be used in the method 300, as would be understood by one of skill in the art upon reading the present descriptions.

In operation 302, each of one or more volumes is assigned to either one or more storage groups or one or more reserve storage pool groups.

In operation 304, each of the one or more volumes assigned to the one or more storage groups is designated as a storage volume.

In one embodiment, this designation may be performed automatically in response to a trigger condition being satisfied. The trigger condition, according to several embodiments, may include any of a period of time having passed, new storage coming online, current storage being taken offline, and receipt of a user request, or any other trigger condition as would be understood by one of skill in the art upon reading the present descriptions.

The designation may be in the form of a group ID being changed to match a group ID of the storage group or groups to which the one or more volumes are assigned, as described in detail later.

In operation 306, each of the one or more volumes assigned to the one or more reserve storage pool groups is designated as a reserve storage volume.

In one embodiment, this designation may be performed automatically in response to a trigger condition being satisfied. The trigger condition, according to several embodiments, may include any of: a period of time having passed, new storage coming online, current storage being taken offline, and receipt of a user request, or any other trigger condition as would be understood by one of skill in the art upon reading the present descriptions.

The designation may be in the form of a group ID being changed to match a group ID of the reserve storage pool group or groups to which the one or more volumes are assigned, as described in detail later.

In one approach, each of the reserve storage volumes are self describing, e.g., the reserve storage pool is automatically named in the reserve storage volume label upon designation thereto, and thus they are discoverable, e.g., by a system attempting to determine reserve storage pool volumes.

According to a preferred embodiment, this designation to a reserve pool group or groups may prevent a designated reserve storage volume from storing data (in some embodiments, this reserve pool group designation may prevent it from being brought online) until the designated reserve storage volume is designated as a storage volume (in some embodiments, this storage group designation may allow it to be brought online).

In operation 308, policy attributes are received for at least one of the storage groups. The policy attributes include, but are not limited to, a storage utilization goal for delimiting an ideal storage utilization range for the at least one storage group, and a default reserve storage pool assignment for associating a default reserve storage pool group with the at least one storage group.

According to one embodiment, the policy attributes may be set by a user. Of course, they may alternatively be set by default, and then be configurable by the user, by an administrator, by a managing application, etc.

In operation 310, a storage utilization level for the at least one storage group is monitored. Any monitoring technique, tool, system, procedure, etc., may be used to monitor the storage utilization level as would be understood by one of skill in the art upon reading the present descriptions.

In operation 312, it is detected when the storage utilization level for the at least one storage group falls outside of the ideal storage utilization range.

In operation 314, an available storage amount for the at least one storage group is adjusted to bring the storage utilization level within the ideal storage utilization range.

In one embodiment, this adjustment may be executed automatically in response to a trigger condition being satisfied. Any trigger condition may be used as would be understood by one of skill in the art upon reading the present descriptions.

According to one embodiment, the adjustment may comprise discovering a first reserve storage volume within a default reserve storage pool group associated with the at least one storage group, assigning the first reserve storage volume to the at least one storage group, designating the first reserve storage volume as a first storage volume, and bringing the first storage volume online.

In a more simplistic embodiment, the adjustment may comprise discovering a first reserve storage volume, assigning the first reserve storage volume to the at least one storage group, and designating the first reserve storage volume as a first storage volume. Of course, any other adjustment techniques, procedures, methods, and/or tools may be used to accomplish the adjustment of the storage amount for the at least one storage group.

In one embodiment, the method 300 may further comprise defining at least two pool groups, the at least two pool groups comprising the one or more storage groups, and the one or more reserve storage pool groups, as previously described. The storage groups are intended to be used to actually store data, while the reserve storage pools are intended to be used as reserve storage space in case the storage group storage exceeds a threshold, such as 70% capacity, 80% capacity, 90% capacity, etc.

In one embodiment, a system may include one or more storage volumes and logic configured to define at least two pool groups, the at least two pool groups comprising at least one storage group and at least one reserve storage pool group, logic configured to assign each of the one or more storage volumes to either one or more of the at least one storage group or one or more of the at least one reserve storage pool group, logic configured to designate each of the one or more volumes assigned to a storage group as a storage volume, logic configured to designate each of the one or more volumes assigned to a reserve storage pool group as a reserve storage volume, logic configured to receive policy attributes for at least one storage group, logic configured to monitor a storage utilization level for the at least one storage group, logic configured to detect when the storage utilization level for the at least one storage group falls outside of the ideal storage utilization range, and logic configured to adjust an available storage amount for the at least one storage group to bring the storage utilization level within the ideal storage utilization range. In some approaches, the policy attributes comprise a storage utilization goal for delimiting an ideal storage utilization range for the at least one storage group and a default reserve storage pool assignment for associating a default reserve storage pool group with the at least one storage group. Of course, other policy attributes may be specified according to various other embodiments, as would be understood by one of skill in the art upon reading the present descriptions.

Any of the previous embodiments described in relation to method 300 may be implemented in the context of the logic of the system as would be understood by one of skill in the art upon reading the present descriptions.

In one embodiment, the logic configured to designate each of the one or more volumes assigned to one of the one or more storage groups as a storage volume and the logic configured to designate each of the one or more volumes assigned to one of the one or more reserve storage pool groups as a reserve storage volume may be executed automatically in response to a trigger condition being satisfied. Any of the previously described trigger conditions, as well as any trigger conditions as would be understood by one of skill in the art upon reading the present descriptions may be used according to various embodiments, such as a period of time having passed, new storage coming online, current storage being taken offline, and/or receiving a user request.

In another embodiment, the logic configured to designate each of the one or more volumes assigned to one of the one or more reserve storage pool groups as a reserve storage volume may prevent a designated reserve storage volume from storing data until the designated reserve storage volume is designated as a storage volume.

According to another embodiment, the logic configured to adjust the available storage amount for the at least one storage group to bring the storage utilization level for the at least one storage group within the ideal storage utilization range for the at least one storage group may comprise logic configured to discover a first reserve storage volume, logic configured to assign the first reserve storage volume to the at least one storage group, and logic configured to designate the first reserve storage volume as a first storage volume.

Of course, this logic may be implemented as a method on any device and/or system or as a computer program product, according to various embodiments.

For example, in one embodiment, a computer program product for managing storage may comprise a computer readable storage medium having computer readable program code embodied therewith. The computer readable program code may be configured to assign each of one or more volumes to either one or more storage groups or one or more reserve storage pool groups, designate each of the one or more volumes assigned to the one or more storage groups as a storage volume, designate each of the one or more volumes assigned to the one or more reserve storage pool groups as a reserve storage volume, receive policy attributes for at least one of the storage groups, monitor a storage utilization level for the at least one storage group, detect when the storage utilization level for the at least one storage group falls outside of the ideal storage utilization range, and adjust an available storage amount for the at least one storage group to bring the storage utilization level within the ideal storage utilization range. The policy attributes may comprise a storage utilization goal for delimiting an ideal storage utilization range for the at least one storage group, and a default reserve storage pool assignment for associating a default reserve storage pool group with the at least one storage group.

In one embodiment, the computer readable program code may be configured to define at least two pool groups. The at least two pool groups may comprise the one or more storage groups, and the one or more reserve storage pool groups. Of course, other pool groups may also be defined, as would be understood by one of skill in the art upon reading the present descriptions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for managing storage, the computer program product comprising a computer readable storage medium having computer readable program code embodied therewith, the computer readable program code comprising:
   computer readable program code configured to assign each of one or more volumes to either: one or more storage groups or one or more reserve storage pool groups;
   computer readable program code configured to designate each of the one or more volumes assigned to the one or more storage groups as a storage volume;
   computer readable program code configured to designate each of the one or more volumes assigned to the one or more reserve storage pool groups as a reserve storage volume; and
   computer readable program code configured to receive policy attributes for at least one of the storage groups, the policy attributes comprising:
      a storage utilization goad for delimiting an ideal storage utilization range for the at least one storage group; and
      a default reserve storage pool assignment for associating a default reserve storage pool group with the at least one storage group;
   computer readable program code configured to monitor a storage utilization level for the at least one storage group;
   computer readable program code configured to detect when the storage utilization level for the at least one storage group falls outside of the ideal storage utilization range;
   computer readable program code configured to adjust an available storage amount for the at least one storage group to bring the storage utilization level within the ideal storage utilization range; and
   computer readable program code configured to initialize at least one of the volumes by initializing at least a first four bytes of a volume label record corresponding to the at least one of the volumes with characters indicating that the at least one of the volumes is reserved as opposed to available;
   computer readable program code configured to determine whether a default reserve storage pool (DSRP) has been assigned for a given storage group; and
   computer readable program code configured to seek, initialize, and mount available reserve storage pool volumes for the given storage group according to a RESERVE policy parameter in response to determining that no DSRP has been assigned for the given storage group.

2. The computer program product of claim 1, further comprising computer readable program code configured to define at least two pool groups, the at least two pool groups comprising:
the one or more storage groups; and
the one or more reserve storage pool groups.

3. The computer program product of claim 1, wherein the computer readable program code configured to designate each of the one or more volumes assigned to one of the one or more storage groups as a storage volume and the computer readable program code configured to designate each of the one or more volumes assigned to one of the one or more reserve storage pool groups as a reserve storage volume are executed in response to a trigger condition being satisfied.

4. The computer program product of claim 3, wherein the trigger condition comprises at least one of:
a period of time having passed;
new storage coming online;
current storage being taken offline; and
receiving a user request.

5. The computer program product of claim 1, wherein each of the reserve storage volumes are self-describing, and
wherein each of the reserve storage volumes are discoverable using a scan service.

6. The computer program product of claim 1, wherein the computer readable program code configured to designate each of the one or more volumes assigned to one of the one or more reserve storage pool groups as a reserve storage volume is executed automatically in response to a trigger condition being satisfied, and
wherein the characters indicating that the at least one of the volumes is reserved as opposed to available comprise a string including the character sequence "RSV".

7. The computer program product of claim 1, wherein the computer readable program code configured to designate each of the one or more volumes assigned to one of the one or more reserve storage pool groups as a reserve storage volume prevents a designated reserve storage volume from storing data until the designated reserve storage volume is designated as a storage volume.

8. The computer program product of claim 1, wherein the computer readable program code configured to adjust the available storage amount for the at least one storage group to bring the storage utilization level for the at least one storage group within the ideal storage utilization range for the at least one storage group is executed automatically in response to a trigger condition being satisfied.

9. The computer program product of claim 8, further comprising computer readable program code configured to define at least two pool groups, the at least two pool groups comprising:
the one or more storage groups; and
the one or more reserve storage pool groups;
wherein the computer readable program code configured to adjust the available storage amount for the at least one storage group to bring the storage utilization level for the at least one storage group within the ideal storage utilization range for the at least one storage group comprises:
computer readable program code configured to discover a first reserve storage volume within a default reserve storage pool group associated with the at least one storage group;
computer readable program code configured to assign the first reserve storage volume to the at least one storage group;
computer readable program code configured to designate the first reserve storage volume as a first storage volume; and
computer readable program code configured to bring the first storage volume online,
wherein the computer readable program code configured to designate each of the one or more volumes assigned to one of the one or more storage groups as a storage volume and the computer readable program code configured to designate each of the one or more volumes assigned to one of the one or more reserve storage pool groups as a reserve storage volume are each executed in response to a trigger condition being satisfied,
wherein the trigger condition comprises at least one of:
a period of time having passed:
new storage coming online;
current storage being taken offline: and
receiving a user request,
wherein each of the reserve storage volumes are self-describing;
wherein each of the reserve storage volumes are discoverable using a scan service;
and
wherein the computer readable program code configured to designate each of the one or more volumes assigned to one of the one or more reserve storage pool groups as a reserve storage volume prevents a designated reserve storage volume from storing data until the designated reserve storage volume is designated as a storage volume.

10. The computer program product of claim 1, wherein the computer readable program code configured to adjust the available storage amount for the at least one storage group to bring the storage utilization level for the at least one storage group within the ideal storage utilization range for the at least one storage group comprises:
computer readable program code configured to discover a first reserve storage volume;
computer readable program code configured to assign the first reserve storage volume to the at least one storage group; and
computer readable program code configured to designate the first reserve storage volume as a first storage volume.

11. A system, comprising:
at least one data storage device for storing one or more storage volumes;
logic configured to define at least two pool groups, the at least two pool groups comprising:
at least one storage group; and
at least one reserve storage pool group;
logic configured to assign each of the one or more storage volumes to either: one or more of the at least one storage group or one or more of the at least one reserve storage pool group;
logic configured to designate each of the one or more volumes assigned to a storage group as a storage volume;
logic configured to designate each of the one or more volumes assigned to a reserve storage pool group as a reserve storage volume;
logic configured to receive policy attributes for at least one storage group, the policy attributes comprising:
a storage utilization goal for delimiting an ideal storage utilization range for the at least one storage group; and a default reserve storage pool assignment for associating a default reserve storage pool group with the at least one storage group;

logic configured to monitor a storage utilization level for the at least one storage group;

logic configured to detect when the storage utilization level for the at least one storage group falls outside of the ideal storage utilization range; and logic configured to adjust an available storage amount for the at least one storage group to bring the storage utilization level within the ideal storage utilization range; and logic configured to determine whether a default reserve storage pool (DSRP) has been assigned for a given storage group; and logic configured to seek, initialize, and mount available reserve storage pool volumes for the given storage group according to a RESERVE policy parameter in response to determining that no DSRP has been assigned for the given storage group.

12. The system as recited in claim 11, wherein the logic configured to designate each of the one or more volumes assigned to one of the one or more storage groups as a storage volume and the logic configured to designate each of the one or more volumes assigned to one of the one or more reserve storage pool groups as a reserve storage volume are each executed automatically in response to a trigger condition being satisfied, and wherein the logic configured to designate each of the one or more volumes assigned to one of the one or more reserve storage pool groups as a reserve storage volume comprises logic configured to modify a volume record label of each designated reserve storage volume with a predetermined character string indicating that the each of the one or more volumes is reserved as opposed to available.

13. The system as recited in claim 12, wherein the trigger condition comprises at least one of:
a period of time having passed;
new storage coming online;
current storage being taken offline; and
receiving a user request; and
wherein the predetermined character string includes the character sequence "RSV".

14. The system as recited in claim 11, wherein the logic configured to designate each of the one or more volumes assigned to one of the one or more reserve storage pool groups as a reserve storage volume prevents a designated reserve storage volume from storing data until the designated reserve storage volume is designated as a storage volume, wherein each reserve storage pool is configured to be used as reserve storage space in case a storage group storage to which the reserve storage pool is assigned exceeds a capacity threshold, and wherein the capacity threshold is at least 70% capacity.

15. The system as recited in claim 11, wherein the logic configured to adjust the available storage amount for the at least one storage group to bring the storage utilization level for the at least one storage group within the ideal storage utilization range for the at least one storage group comprises:

the logic configured to discover a first reserve storage volume;

the logic configured to assign the first reserve storage volume to the at least one storage group; and the logic configured to designate the first reserve storage volume as a first storage volume wherein each reserve storage pool is configured to be used as reserve storage space in case a storage group storage to which the reserve storage pool is assigned exceeds a capacity threshold, wherein the capacity threshold is at least 70% capacity wherein the logic configured to designate each of the one or more volumes assigned to one of the one or more storage groups as a storage volume and the logic configured to designate each of the one or more volumes assigned to one of the one or more reserve storage pool groups as a reserve storage volume are executed automatically in response to a trigger condition being satisfied, wherein the trigger condition comprises at least one of:
a period of time having passed;
new storage coming online;
current storage being taken offline; and
receiving a user request, wherein the logic configured to designate each of the one or more volumes assigned to one of the one or more reserve storage pool groups as a reserve storage volume comprises logic configured to modify available reserve storage volume record labels to include a predetermined character string, wherein the logic configured to designate each of the one or more volumes assigned to one of the one or more reserve storage pool groups as a reserve storage volume prevents a designated reserve storage volume from storing data until the designated reserve storage volume is designated as a storage volume.

16. A method, comprising:

assigning each of one or more volumes to either: one or more storage groups or one or more reserve storage pool groups;

designating each of the one or more volumes assigned to the one or more storage groups as a storage volume;

designating each of the one or more volumes assigned to the one or more reserve storage pool groups as a reserve storage volume;

receiving policy attributes for at least one of the storage groups, the policy attributes comprising:
a storage utilization goal for delimiting an ideal storage utilization range for the at least one storage group; and
a default reserve storage pool assignment for associating a default reserve storage pool group with the at least one storage group;

monitoring a storage utilization level for the at least one storage group;

detecting when the storage utilization level for the at least one storage group falls outside of the ideal storage utilization range; and adjusting an available storage amount for the at least one storage group to bring the storage utilization level within the ideal storage utilization range;

determining whether a default reserve storage pool (DSRP) has been assigned for a given storage group; and seeking, initializing, and mounting available reserve storage pool volumes for the given storage group according to a RESERVE policy parameter in response to determining that no DSRP has been assigned for the given storage group, wherein designating each of the one or more volumes assigned to the one or more storage groups as a storage volume comprises changing a group ID of the one or more volumes to match a group ID of at least one of the storage groups.

17. The method as recited in claim 16, wherein designating each of the one or more volumes assigned to one of the one or more storage groups as a storage volume and designating each of the one or more volumes assigned to one of the one or more reserve storage pool groups as a reserve storage volume are performed automatically in response to a trigger condition being satisfied.

18. The method as recited in claim 16, wherein designating each of the one or more volumes assigned to one of the one or more reserve storage pool groups as a reserve storage volume:
(a) is performed automatically in response to a trigger condition being satisfied;
(b) comprises modifying a volume record label of each of the one or more volumes assigned to one or more of the reserve storage pool groups to include a character string "RSV;" and
(c) prevents a designated reserve storage volume from storing data until the designated reserve storage volume is designated as a storage volume.

19. The method as recited in claim 16, wherein adjusting the available storage amount for the at least one storage group to bring the storage utilization level for the at least one storage group within the ideal storage utilization range for the at least one storage group is performed automatically in response to a trigger condition being satisfied.

20. The method as recited in claim 16, wherein adjusting the available storage amount for the at least one storage group to bring the storage utilization level for the at least one storage group within the ideal storage utilization range for the at least one storage group comprises:
discovering a first reserve storage volume;
assigning the first reserve storage volume to the at least one storage group; and
designating the first reserve storage volume as a first storage volume,
wherein designating each of the one or more volumes assigned to one of the one or more storage groups as a storage volume and designating each of the one or more volumes assigned to one of the one or more reserve storage pool groups as a reserve storage volume are performed automatically in response to a trigger condition being satisfied,
wherein the trigger condition comprises at least one of:
a period of time having passed;
new storage coming online;
current storage being taken offline; and
receiving a user request,
wherein designating each of the one or more volumes assigned to one of the one or more reserve storage pool groups as a reserve storage volume is performed automatically in response to a trigger condition being satisfied,
wherein designating each of the one or more volumes assigned to one of the one or more reserve storage pool groups as a reserve storage volume prevents a designated reserve storage volume from storing data until the designated reserve storage volume is designated as a storage volume,
wherein designating each of the one or more volumes assigned to one of the one or more reserve storage pool groups as a reserve storage volume comprises modifying a volume record label associated with each of the one or more volumes assigned to the one or more of the reserve storage pool groups to include a predetermined character string, and
wherein adjusting the available storage amount for the at least one storage group to bring the storage utilization level for the at least one storage group within the ideal storage utilization range for the at least one storage group is performed automatically in response to a trigger condition being satisfied.

* * * * *